(No Model.)
A. A. ROBERTS.
PLOW.
No. 291,087. Patented Jan. 1, 1884.
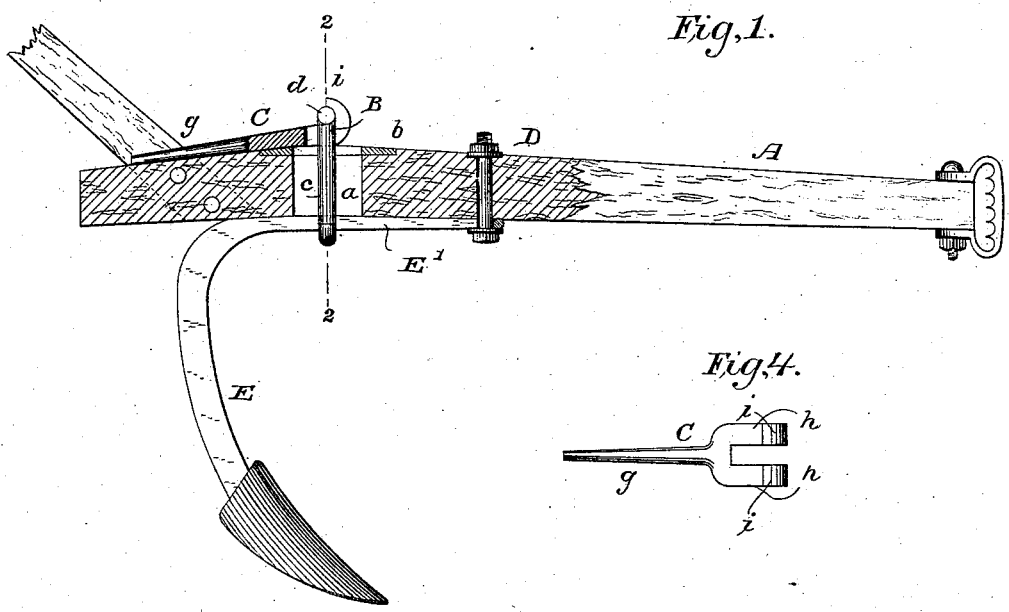
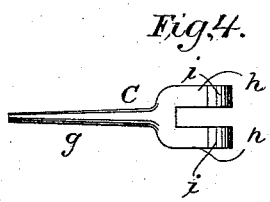
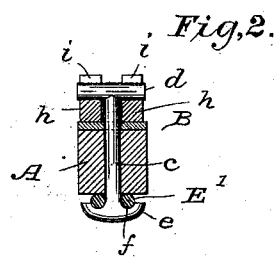
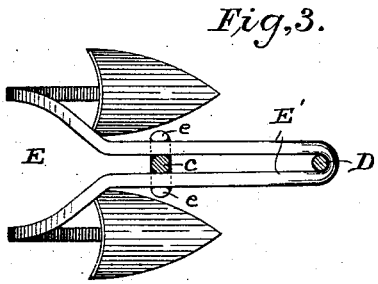
WITNESSES
Wm A. Skinkle
Jos. S. Latimer
INVENTOR
A. A. Roberts
By his Attorneys
Baldwin, Hopkins & Peyton

UNITED STATES PATENT OFFICE.

AARON A. ROBERTS, OF QUITMAN, ARKANSAS.

PLOW.

SPECIFICATION forming part of Letters Patent No. 291,087, dated January 1, 1884.

Application filed September 12, 1883. (No model.)

*To all whom it may concern:*

Be it known that I, AARON A. ROBERTS, of Quitman, Cleburne county, Arkansas, have invented certain new and useful Improvements in Plows, of which the following is a specification.

My invention consists in an improved device for attaching the cutting or working part of an agricultural implement to its carrying frame or support.

My improvements are applicable to several kinds of agricultural implements, but will be herein described as applied to cultivator-plows, for which they are more especially designed.

In the accompanying drawings, Figure 1 is an elevation of part of a plow embodying my improvements, and Figs. 2, 3, and 4 are detail views of my improved securing device.

The beam A is formed at its rear end with a narrow slot or socket, $a$, the top of which is surrounded by a metallic frame or face-plate, $b$. A securing or clamping device, B, extends through the socket $a$, and is free to move vertically and horizontally therein.

The clamping device is shown more clearly in Fig. 2. It is preferably formed of metal, and consists of a central shank, $c$, a cross-head, $d$, (both ends of which are preferably circular in cross-section,) and a pair of arms, $ee$, which radiate from the lower end of the shank $c$, and which are hollowed out at $ff$ to form seats for the branches of the plow-shank.

Pivotally secured to the cross-head $d$ is a lever, C. (Shown more clearly in Fig. 4.) It consists of a handle, $g$, having a forked end, $hh$. The ends of the prongs straddle the slot $a$, and are hooked at $i$, Fig. 1, so as to embrace the arms of the cross-piece $d$, and thus be pivotally secured thereto. The hooked end of the lever is cam-shaped, so that when pressed down in one direction the clamping device B will be lowered or loosened, and when turned over and pressed down in the other direction the device B will be raised, so as to hold the arms $ee$ tightly against the bottom of the beam.

The device B may be readily inserted or removed from its socket when the arms $ee$ are parallel with the length of the slot.

A short distance beyond the socket $a$, toward the front end of the beam, is a bolt, D, which is provided with an enlarged head to hold the forward end of the plow-beam, and which may readily be removed from its socket in the beam.

Instead of the bolt D, a clamping device similar to that shown at B may be employed.

I have shown in the drawings a double-shovel plow secured to the beam by my improved device. The shanks E are provided with a looped extension, E', at nearly right angles with the shanks, so as to hold the blades in proper position for cutting when the extension is horizontal.

To secure the shanks to the beam, the bolt D is removed and passed up through the looped extension at its extreme end, as illustrated in Fig. 1 and in cross-section in Fig. 3. When firmly secured, the clamping device is turned until the arms $ee$ are parallel with the opening in the looped extension. It is then lowered, and afterward turned so that the arms $e$ shall embrace the side bars of the extension. If, now, the lever be turned back as shown in Fig. 1, the plow will be firmly secured to the beam, from which it may be readily removed to give place to another.

I claim as my invention—

1. The combination of the beam, the cam-lever C, pivoted thereon and forked at the end, and the clamping-bolt having the cross-head which engages with the forked end of the cam-lever, substantially as specified.

2. The combination of the beam, the cutting implement having the looped shank-extension E', the cam-lever C, and the clamping device B, adapted to secure the extension to the beam, as set forth.

In testimony whereof I have hereunto subscribed my name this 27th day of August, A. D. 1883.

A. A. ROBERTS.

Witnesses:
 E. F. ROBERTS,
 W. L. THOMPSON.